3,284,404
ENVIRONMENTAL STRESS-CRACK RESISTANT POLYESTERURETHANES CONTAINING TRIACETIC ACID SUBSTITUTED ALKYLENE DIAMINES
Charles S. Schollenberger and Walter T. Murphy, Cuyahoga Falls, Ohio, assignors to The B. F. Goodrich Company, New York, N.Y., a corporation of New York
No Drawing. Filed Aug. 9, 1963, Ser. No. 301,174
5 Claims. (Cl. 260—45.85)

This invention relates to the production of polyurethane polymers having improved resistance to environmental stress-cracking.

It has long been the practice in the art of compounding high polymers, natural rubber, synthetic rubbers, polyethylene, polyurethanes and the like, to add specific materials to combat the degradative effects of atmosphere, heat, sunlight and the like. Generally these additive materials are called antioxidants as oxidation is the most common process by which these external forces exert their degradative effects on the polymeric materials. The effects of ozone, a special form of oxygen found in varying concentrations in the atmosphere, are usually combatted by the use of a special class of deterioration retarders known as antiozonants. In general, materials that act as antioxidants have little or no effect as antiozonants, and the reverse is also true.

In addition to these forms of high polymer deterioration, another type of polymer destruction known as environmental stress-cracking has been noted in recent years. While at first this type of stress-cracking seems to be oxidation caused by an aging such as by heat or light, it has been noted that the deterioration proceeds at spectacular rates in particular environments and is not significantly arrested by known antioxidants. This phenomenon of environmental stress-cracking was noticed in polyethylene in 1946, Transactions of the Faraday Society, 42, 10 (1946), and is also discussed in SPE Journal, 15, 397 (1959). Environments such as fresh water, sea water, soaps and alcohols are not considered to be serious sources of oxidation degradation of compounded polymers, yet stressed samples exposed to these environments crack with astonishing speed and amazing completeness. An acceptable definition of environmental stress-cracking is "failure in surface-initiated brittle fracture of a polymer specimen or part under polyaxial stress in contact with a medium in the absence of which fracture does not occur under the same conditions of stress. Combinations of external and/or internal stress may be involved and the sensitizing medium may be gaseous, liquid, semi-solid or solid." It has been learned that polar liquids in particular contribute to this special form of stress-cracking. These include alcohols, surfactants, water and sea water. These simultaneous conditions must be present for environmental stress-cracking to occur, namely, (1) a stress, (2) a stress-cracking agent, and (3) time for the agent to act. Environmental stress failure is differentiated from impact failure, which it somewhat resembles in appearance, by the fact that failure does not occur immediately on imposition of stress, but only after some finite interval. There must also be present some external sensitizing or accelerating agent as opposed to fatigue failures in the absence of such media.

The phenomenon of environmental stress-cracking was first noticed in ethylene polymers. Another class of polymers that has been growing annually in production and use is the polyurethanes and these materials also have been shown to be subject to this form of deterioration.

Polyesterurethanes are well known materials. They may be made by the reaction of polyisocyanates, usually diisocyanates, with polyesterglycols, said polyesterglycols being obtained by the reaction of polyols and polybasic acids, for example, glycols and dibasic acids, or by transesterification. Molecular weights range from about 10,000 to 40,000 or more. Typical linear, uncrosslinked, elastomeric polyesterurethanes of this class are described in United States Patent Number 2,871,218. These polyesterurethanes are essentially linear polymers comprising the reaction product of one mol of an essentially linear hydroxyl terminated polyester of a saturated aliphatic glycol having from 2 to 10 carbon atoms and having hydroxyl groups on its terminal carbon atoms and a material selected from the group consisting of a dicarboxylic acid of the formula HOOC—R—COOH where R is an alkylene radical containing from 2 to 8 carbon atoms and its anhydride, said polyester having an average molecular weight of 600 to 1200 and having an acid number less than 10, with from about 1.1 to 3.1 mols of a diphenyl diisocyanate having an isocyanate group on each phenyl nucleus in the presence of from about 0.1 to 2.1 mols of a saturated aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no free isocyanate or hydroxyl groups in said reaction product.

The reaction mixture forming the polyesters may contain minor amounts of amino alcohols, diamines and the like. Depending on the equivalents of OH and COOH group-containing reactants charged, the resulting polyesters may contain regulated ratios of terminal OH and COOH groups. In addition, depending on the type of glycol, dibasic acid and other component employed and on the time of reaction, the molecular weight of the polyesters may be varied somewhat. Thus, the polyesters employed, although containing a predominant amount of ester groups and terminal carboxyl and/or hydroxyl groups, will vary as to their chemical and physical properties. The amount and type of polyisocyanate employed will also vary the properties of the polyesterurethanes ultimately obtained.

The reaction mixture may also be supplemented with glycols, polyols, amines, amino alcohols, water and the like in minor amounts so that the properties of the resulting polyesterurethanes are further modified. Additional polyisocyanate may be added to the polyesterurethane to cross-link the polymer and further change its properties.

Polyetheresterurethanes may also be made by mixing together various polyesters and polyethers, or various glycols, polyalkylene ether glycols and dibasic acids, and then reacting them with different polyisocyanates in varying amounts.

The polyesterurethanes have many different properties. They range from hard to soft, from rubbery to resinous, from solids to foams or liquids. They may or may not be cross-linked. Certain polyurethane polymers make excellent jacketing materials for wire, cable and the like. These items are often laid under water, particularly under sea water and environmental stress-cracking of the polyurethanes under these conditions has become a serious problem. Cracking of cable jackets causes failure of cable operation and requires expensive replacement of damaged cable.

When a specimen maintained under constant external stress is at one moment intact and at a subsequent moment ruptured, one of two things has happened. Either the polymer has been weakened by the action of some agency, operating externally or internally, to an extent such that the material can no longer sustain the stress imposed upon it, or a physical change of some sort within the polymer mass has brought about a redistribution of the internal stresses present to produce, in combination with the externally applied forces, a resultant failure by exceeding the strength of the material at the point of failure. Severe environmental stress-cracking has been observed in extended samples of polyurethane polymers held under sea water. Somewhat surprising is the fact that the temperature of the sea water has no effect on the rate of cracking, nor does the manner in which the polyurethane polymer is produced. The polymers may be molded, calendered or cast from a solution—all will crack under stress at approximately the same rate. Sea water is polar in nature and is not an active swelling agent for polyurethanes. The stress-crack failures in the polyurethane polymers show apparently brittle characteristics of the fracture produced and have distinctive rib and hackle patterns such as are found in glass fractures.

It is an object of this invention to provide essentially linear polyurethane polymers which in a state of polyaxial stress will exhibit great resistance to environmental stress-cracking. It is a further object to provide a class of materials, which when combined with the polyesterurethane polymers will impart to said polymers greatly improved resistance to environmental stress-cracking in polar fluids, particularly in sea water. Other objects will be apparent from the discussion below.

The propagation of cracks in environmental stress-cracking of polymeric materials appears to depend on the presence of intercrystalline boundaries held together chiefly by forces weaker than primary valence bonds. The concentration of such interfaces in a given unit volume of polymer would be expected to increase with increases in the low molecular weight fraction of the polymer and with increasing size of the crystalline aggregates present.

We have discovered that when minor amounts of certain water insoluble chelating agents are compounded into linear polyesterurethane polymers, marked improvement in the environmental stress-cracking resistance of the polymer occurs. The mechanism of how these chelating agents act to accomplish this improvement is not known, nor is it known why agents of a particular structure accomplish this improvement and agents of closely related or similar structure do not provide the same improvement.

The chelating agents employed in the practice of this invention as environmental stress-cracking resistors are tri-acetic acid-substituted alkylene diamines having the structure

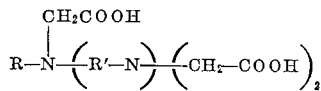

wherein R is a hydrocarbon group having from 6 to 20 carbon atoms, and R′ is an alkylene group having from 2 to 10 carbon atoms.

The chelating agents, or stated differently, the compounds capable of forming coordination complexes with polyvalent metals, embodied herein are all substantially insoluble in water; they are soluble in or compatible with polyurethane polymers, and they all conform to the structure

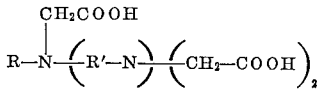

wherein R, and R′ each has the aforementioned designation. Illustrative specific compounds falling into this class are the following:

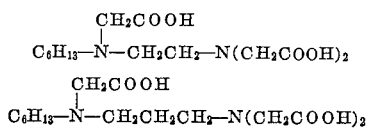

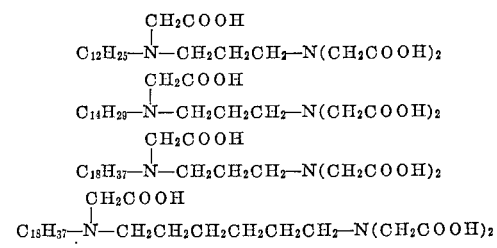

Improved resistance to environmental stress-cracking in linear polyesterurethane polymers, particularly in sea water, is readily obtained by milling minor amounts of the materials described above into the polyurethane polymers before said polymers are shaped into manufactured articles. Similar protection of the polyurethane polymers is obtained by incorporating the additive into a solution of the polyurethane polymer and then depositing a film of the compounded polymer. Attempts to incorporate the chelators into the reaction mixture when the polyurethane polymers are prepared have generally been found to be unsuccessful.

The phenomenon of environmental stress-cracking in linear polyesterurethane polymers does not appear to be a chemical breakdown. Viscosity measurements made on polymers before and after the cracking occurs indicate no loss in molecular weight. Extra exposure to oxygen and heat does not increase the rate of stress failure nor do standard antioxidants or antihydrolysis agents retard it.

The chelating agents employed in our invention to prevent environmental stress-cracking in linear polyesterurethane polymers are readily prepared by reacting chloracetic acid in neutral solution with various alkyl-substituted alkylene polyamines. The acid reacts with the active hydrogen on the amino nitrogens to yield triacetic acid-substituted polyamine and by-product HCl. The acid chelator is precipitated by lowering the reaction pH to an acid level of 2. The products are solid and easily recovered by filtration, then washed and dried. The preparation of these chelating agents is more fully described in copending patent application Serial Number 192,080, filed May 3, 1962, now United States Patent Number 3,228,904, issued January 11, 1966. From 0.5 part to 5.0 parts of chelating agent per 100 parts linear polyesterurethane polymer are preferred for the practice of this invention. From 1.0 parts to 1.5 parts is an even more preferred range. Less than 0.5 part does not give satisfactory resistance to environmental stress-cracking and more than 5.0 parts has been found to give problems of compatibility between chelating agent and polyester-urethane polymer.

The present invention will be further illustrated by the following examples wherein the amounts of the various ingredients are expressed in parts by weight unless otherwise indicated.

PREPARATION OF CHELATING AGENTS

Dodecyliminodiacetic acid is prepared as follows: Chloracetic acid (1.1 mole) in 800 ml. of ethanol is neutralized by the addition of 125 ml. of 10 N aqueous sodium hydroxide. Dodecylamine (0.5 mole) is added to the mixture and the solution is heated to 80° C. The pH is maintained at from 8 to 10 by the gradual addition of more 10 N sodium hydroxide solution until the theoretically required amount of sodium hydroxide has been added. The reaction mixture is then brought to room temperature and the dodecyliminodiacetic acid is precipitated by bringing the pH of the mixture to 2 with concentrated hydrochloric acid. The product is isolated by filtration and is washed twice with distilled water and dried to a constant weight of 141.3 g. (94% of theory).

In a similar manner octadecyliminodiacetic acid is prepared.

A chelating agent having the structure

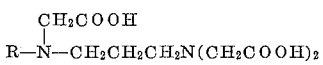

wherein R is a mixture of alkyl groups having an average of 13 carbon atoms is prepared as follows: Chloroacetic acid (2.24 moles) in 400 ml. of methanol is neutralized with 31% NaOH solution. N-coco-trimethylene diamines, an N-alkyl-trimethylene diamine mixture.

wherein R is a mixture of alkyl groups having an average of 13 carbon atoms, 0.25 mole) is added, the reaction mixture is brought to 70–73° C. and the pH of the reaction mixture is maintained at 8–10 by the addition of more 31% NaOH solution until the pH becomes fairly constant for a period of time. The mixture is cooled and the product is precipitated with hydrochloric acid (pH of 2). The solid is isolated by filtration, washed and dried. In a similar manner chelating agents of the formula

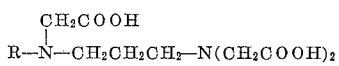

wherein R averages from 17 to 18 carbon atoms are prepared starting with N-soya-trimethylene diamines and N-tallow-trimethylene diamines, mixtures of N-alkyl-trimethylene diamines having as the monoalkyl substituent alkyl groups containing on the average 17 and 18 carbon atoms, respectively.

PREPARATION OF POLYESTERURETHANE POLYMER

Following the teaching of United States Patent 2,871,218, 2323 grams (2.3 mols) of hydroxyl poly(tetramethylene adipate), molecular weight 1010, hydroxyl number 106.1, acid number 2.5, and 207 grams (2.3 mols) of butanediol-1,4 are mixed in a heated autoclave with stirring for 15 minutes at 10 mm. pressure at 100° to 105° C. Next, 1149 grams (4.6 mols) of diphenylmethane-p,p′-diisocyanate are added and stirred in for 2 minutes. The mixture is poured into lubricated metal trays and held in a 140° C. oven for 3 hours. When cooled to room temperature the mass forms a clear, snappy, elastomeric linear polyester-urethane.

Additives being studied are readily milled into the polyesterurethane polymer on standard laboratory mills, the rolls being heated to about 260° F. or enough to have the additive flux into the polymer. Alternatively the additives may be mixed into the polyurethane polymers by forming solutions of each material in common solvents such as tetrahydrofuran, dimethyl formamide and the like and blending the solutions. Films of desired thickness are then cast on smooth metal plates. The compounded polyurethanes are sheeted from the mill and molded for 5 minutes at 309° F. into sheets 6″ x 6″ by 25 mils from which ¾″ strips are cut. The strip samples are evaluated by stretching them over the end prongs of a glass rod shaped in the form of a letter U with a span of 3 inches. The glass bow is preferably of a size such that the sample is initially extended about 20% of its length when it is fastened to the rod. Observation for environmental stress-cracks are made daily.

Example I

One hundred parts of the polyesterurethane prepared above is dissolved in tetrahydrofuran to make a 40 percent by weight solution. An amount of Duomeen T triacetic acid equivalent to 0.1 part of the polymer is also dissolved in tetrahydrofuran and the two solutions are mixed. The mixed solution is cast on to a plate and when the solvent is evaporated a film 8 mils thick is formed. A control film of the same thickness, with no stress-crack resistor added is also formed. Sample strips ¾″ wide are cut and mounted under 20% extension on the glass test frames and immersed in sea water. The control sample cracks in 12 days; the protected sample cracks after 45 days.

Example II

To 100 part lots of the polyesterurethanes prepared above are added varying parts by weight of a variety of additives by milling. Sheets 6″ x 6″ by .025″ are molded of each stock and strip samples for static load tests are cut and mounted. The test strips are immersed in sea water under a variety of conditions and daily observations are made for the appearance of environmental stress-cracking.

TABLE 1

| Additive (parts) | Sea water conditions, ° C. | Days to failure (appearance of stress-cracks) |
|---|---|---|
| None (control) | 20 | 10–12 |
| None (control) | [1] 20 | 10 |
| Ba stearate (1.0) | 20 | 13 |
| Ethylene diamine tetraacetic acid, disodium salt (1.0) | 20 | 25 |
| Dodecylamine diacetic acid (1.0) | 20 | 25 |
| N-alkyl-trimethylene diamine triacetic acid where the mono alkyl group contains on an average of 13 carbon atoms | 20 | 90 |
| N-alkyl-trimethylene diamine triacetic acid where the mono alkyl group contains on an average of 18 carbon atoms | 20 | [2] 180 |
| N-alkyl-trimethylene diamine triacetic acid where the mono alkyl group contains on an average of 18 carbon atoms | 20 | [2] 180 |
| 2,6-di-tert. butyl-para-cresol (1.0) | 20 | 17 |
| 2,6-di-tert. butyl-para-cresol (2.0) | 20 | 17 |
| 2,6-di-tert. butyl-para-cresol (3.0) | 20 | 17 |
| Carbon black (10.0) | 20 | 12 |
| Iso-decyl pelargonate (1.0) | 20 | 13 |

[1] Plus bubbling $O_2$.
[2] No cracks.

When the sea water environment is heated to 50° C., the control sample again survives 12 days, indicating that higher temperatures do not accelerate the action of environmental stress-cracking in sea water.

When octadecyliminodiacetic acid is employed at 1.0 part per 100 parts of polymer, results equivalent to those obtained with dodecylaminodiacetic acid are achieved.

When an N-alkyl-trimethylene diamine triacetic acid wherein the monoalkyl group has an average of 13 carbon atoms and an N-alkyl-trimethylene diamine triacetic acid wherein the mono alkyl group has an average of 17 carbon atoms are employed at 1.0 part per 100 parts of polymer, results equivalent to those obtained with the N-alkyl-trimethylene diamine triacetic acid wherein the mono alkyl group has an average of 18 carbon atoms are achieved.

Barium stearate is a recognized processing aid in compounding linear polyesterurethanes. The 2,6-di-tertiary-butylparacresol is an accepted antioxidant for these materials; EPC black is a reinforcing agent, and iso-decyl pelargonate is a low temperature plasticizer. None if these materials has any effect in stemming the attack of environmental stress-cracking on the linear polyesterurethane polymer in sea water. A slight improvement is found when di- or tetra-acetic acid-substituted materials are employed, but surprisingly, the tri-acetic acid-substituted materials of this invention show outstanding improvement in the resistance to environmental stress-cracking of linear polyester-urethane polymers in sea water.

Example III

When ASTM dumbbell samples are die cut from the molded sheets of linear polyesterurethane prepared in Example II and tested before and after exposure to tap water for 1 week at 70° C., tensile strength is found to drop from 6000 p.s.i. to 2700 p.s.i. This weakening of the polymer is due to chemical hydrolytic attack. Polycarbodiimide is an agent recommended to prevent this hydrolytic degradation. When 3 parts and 5 parts of polycarbodiimide are added per 100 parts of polymer, tensile samples pulled before and after a week's exposure in tap water at 70° C. show these results:

TABLE 2

| Parts PCD | No exposure | 1 week at 70° C. in water |
|---|---|---|
| 3 | 8,200 | 6,500 |
| 5 | 8,600 | 6,700 |

When 3 parts and 5 parts of polycarbodiimide are milled into 100 parts of polymer and the sample is exposed under 20% elongation in sea water at room temperature, stress-cracking is observed as follows:

TABLE 3

Parts polycarbodiimide / Days to crack failure
0 (control) _____ 18
3 _____ 18
5 _____ 18

It seems evident that environmental stress-cracking is not related to hydrolytic degradation and is in no way inhibited by the presence of an anti-hydrolysis agent.

The triacetic acid-substituted diamines of this invention are useful to inhibit environmental stress-cracking in linear polyesterurethane materials, particularly in sea water, when these polymers are fabricated into gloves, inflatable rafts, fuel tanks or reservoirs, cable jackets and the like.

We claim:

1. A composition of matter comprising in combination 100 parts of an essentially linear polyesterurethane elastomer and from 0.5 to 5.0 parts of a tri-acetic acid-substituted alkylene diamine having the formula

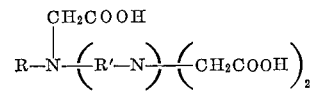

wherein R is a hydrocarbon group having from 6 to 20 carbon atoms on the average and R' is an alkylene group having from 2 to 10 carbon atoms.

2. The composition of matter of claim 1 wherein the said hydrocarbon group, R, contains 13 carbon atoms on the average.

3. The composition of matter of claim 1 wherein the said hydrocarbon group, R, contains 17 carbon atoms on the average.

4. The composition of matter of claim 1 wherein the said hydrocarbon group, R, contains 18 carbon atoms on the average.

5. A composition of matter comprising 100 parts of an essentially linear polyesterurethane elastomer combined with 0.5 to 5.0 parts of a tri-acetic acid-substituted alkylene diamine, said diamine having the formula

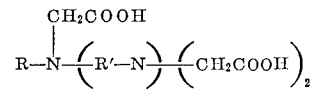

wherein R is an alkyl group containing 6 to 20 carbon atoms on the average and R' is an alkylene group containing 2 to 10 carbon atoms.

References Cited by the Examiner

UNITED STATES PATENTS 2,413,857   1/1947   Bersworth et al. _____ 260—31.8

LEON J. BERCOVITZ, *Primary Examiner.*

G. W. RAUCHFUSS, *Assistant Examiner.*